(12) United States Patent
Kahn et al.

(10) Patent No.: US 11,368,375 B2
(45) Date of Patent: Jun. 21, 2022

(54) APPLICATION FUNCTION INFLUENCED FRAMEWORK FOR TIME SENSITIVE COMMUNICATIONS

(71) Applicant: Nokia Technologies Oy, Espoo (FI)

(72) Inventors: Colin Kahn, Morris Plains, NJ (US); Devaki Chandramouli, Plano, TX (US); Markus Isomaki, Espoo (FI); Peter Rost, Heidelberg (DE); Pilar Andrés Maldonado, Aalborg (DK); Troels Kolding, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/060,858

(22) Filed: Oct. 1, 2020

(65) Prior Publication Data

US 2021/0105192 A1 Apr. 8, 2021

Related U.S. Application Data

(60) Provisional application No. 62/910,374, filed on Oct. 3, 2019.

(51) Int. Cl.
*G06F 15/177* (2006.01)
*H04L 41/5009* (2022.01)
*H04L 41/0806* (2022.01)

(52) U.S. Cl.
CPC ...... *H04L 41/5009* (2013.01); *H04L 41/0806* (2013.01)

(58) Field of Classification Search
USPC ........................................................ 709/222
See application file for complete search history.

(56) References Cited

U.S. PATENT DOCUMENTS

| 6,934,258 B1* | 8/2005 | Smith | H04L 29/06 370/352 |
| 2005/0141560 A1* | 6/2005 | Muthiah | H04L 47/10 370/395.21 |

(Continued)

FOREIGN PATENT DOCUMENTS

| WO | 2019/166081 A1 | 9/2019 |
| WO | 2020/106274 A1 | 5/2020 |
| WO | 2020/245679 A1 | 12/2020 |

OTHER PUBLICATIONS

International Search Report and Written Opinion received for corresponding Patent Cooperation Treaty Application No. PCT/FI2020/050645, dated Jan. 8, 2021, 16 pages.

(Continued)

*Primary Examiner* — Anthony Mejia
(74) *Attorney, Agent, or Firm* — Alston & Bird LLP

(57) ABSTRACT

A method, apparatus and computer program product are provided herein to receive, from a source, performance requirements, and cause transmission, to a network, of a request to influence time sensitive communications (TSC) configuration parameters. For example, a method is provided to in response to the request to influence TSC configuration, receive, from the network, network configuration and radio access network (RAN) resource constraints and determine a quality of service (QoS) and the TSC configuration parameters to support a TSC data stream based on the performance requirements received from the source, the network configuration, and the RAN resource constraints. The method is further configured to cause transmission of the determined QoS and the TSC configuration parameters to the network and the source and in an instance the network (Continued)

accepts the determined QoS and the TSC configuration parameters, configure resources for the TSC data stream and continuously support service continuity.

20 Claims, 8 Drawing Sheets

(56) References Cited

U.S. PATENT DOCUMENTS

| | | | | |
|---|---|---|---|---|
| 2007/0153876 | A1* | 7/2007 | Pi | H04J 13/00 375/140 |
| 2008/0307078 | A1* | 12/2008 | McDaniel | H04L 43/028 709/222 |
| 2009/0080396 | A1* | 3/2009 | Song | H04L 29/08765 370/338 |
| 2013/0325923 | A1* | 12/2013 | Jin | H04L 51/26 709/203 |
| 2014/0177487 | A1* | 6/2014 | Hammarwall | H04W 72/1289 370/336 |
| 2015/0092704 | A1* | 4/2015 | Chen | H04W 72/1231 370/329 |
| 2017/0202005 | A1* | 7/2017 | Madan | H04W 72/1231 |
| 2018/0006955 | A1* | 1/2018 | Bush | H04L 41/0896 |
| 2018/0091410 | A1* | 3/2018 | Browne | H04L 41/5009 |
| 2018/0288791 | A1* | 10/2018 | Turtinen | H04W 72/1226 |
| 2018/0316557 | A1* | 11/2018 | Frangieh | H04L 41/0806 |
| 2018/0316799 | A1* | 11/2018 | Shaw | H04L 12/14 |
| 2021/0227452 | A1* | 7/2021 | Munz | H04L 41/0806 |

OTHER PUBLICATIONS

"3rd Generation Partnership Project; Technical Specification Group Services and System Aspects; Study on enhancement of 5G System (5GS) for vertical and Local Area Network (LAN) services (Release 16)", 3GPP TR 23.734, V16.2.0, Jun. 2019, pp. 1-117.

"3rd Generation Partnership Project; Technical Specification Group Services and System Aspects; Policy and Charging Control Framework for the 5G System (5GS); Stage 2 (Release 16)", 3GPP TS 23.503, V16.2.0, Sep. 2019, pp. 1-104.

"3rd Generation Partnership Project; Technical Specification Group Services and System Aspects; System Architecture for the 5G System (5GS); Stage 2 (Release 16)", 3GPP TS 23.501, V16.2.0, Sep. 2019, pp. 1-391.

Jun et al., "Ultra-low-latency Services in 5G systems: A Perspective from 3GPP standards", ETRI Journal, vol. 42, No. 5, 2020, pp. 721-733.

"3rd Generation Partnership Project; Technical Specification Group Technical Specification Group Services and System Aspects; Service requirements for Video, Imaging and Audio for Professional Applications (VIAPA); Stage 1 (Release 17)", 3GPP TS 22.263, V1.0.0, Sep. 2019, pp. 1-17.

"TSN—Exposure QoS", SA WG2 Meeting #136-AH, S2-2001663, Agenda : 6.x.x, Nokia, Jan. 13-17, 2020, pp. 1-4.

* cited by examiner

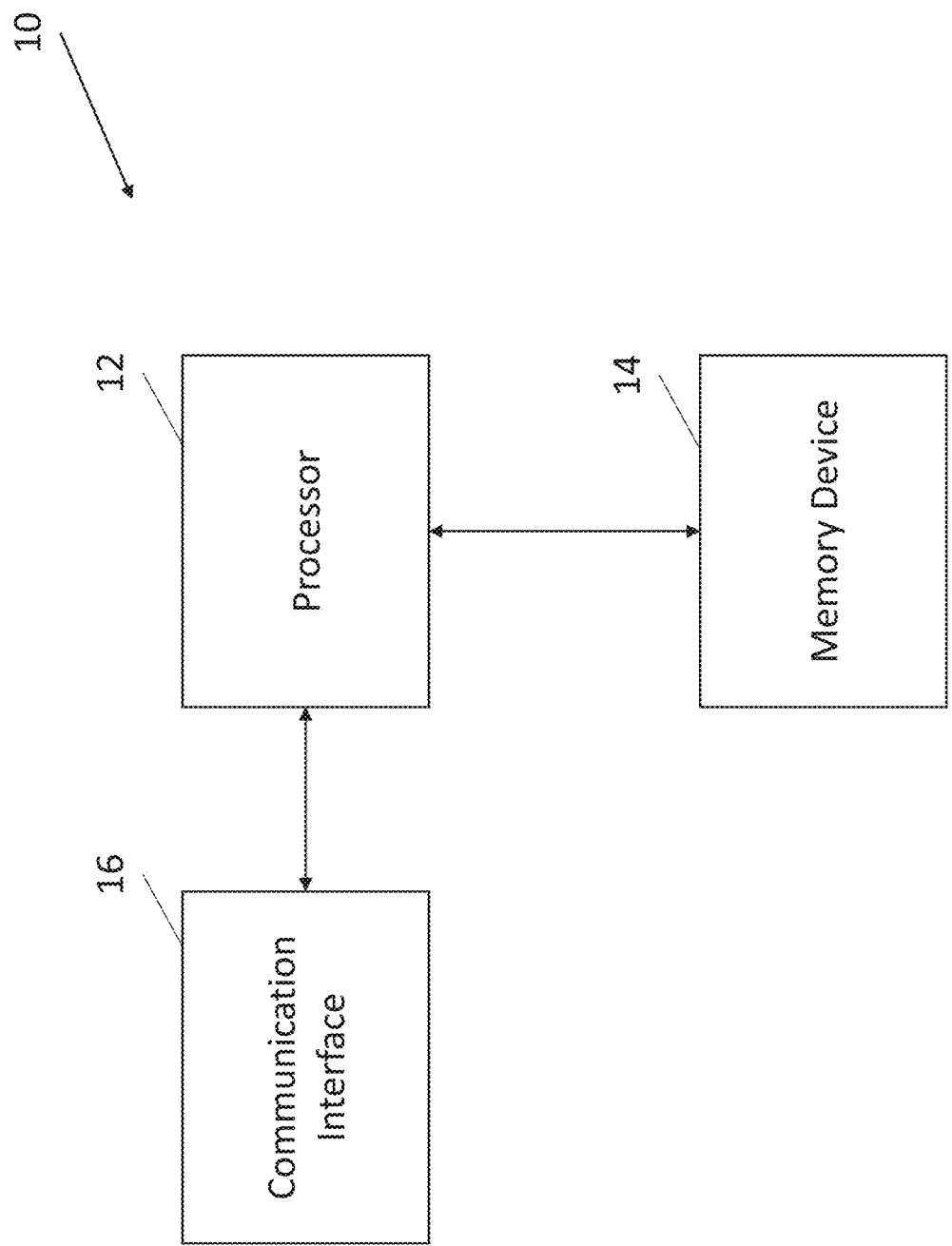

| Profile | # of active UEs | # of UL streams | # of DL streams | UE Speed | Service Area | E2E latency (Note 1) | Transfer interval (Note 1) | Packet error rate (Note 2) | Data rate UL | Data rate DL |
|---|---|---|---|---|---|---|---|---|---|---|
| Integrated audience services | 50000 | - | 30 multicast streams | 5 km/h | 1.5 km × 1.5 km | 5 ms DL | 5 ms | $10^{-3}$ | - | 200 kbit/s |
| Intercom system | 1000 | 240 (Note 3) | 30 multicast streams | 5 km/h | 1.5 km × 1.5 km | 3 ms DL 3 ms UL | 3 ms | $10^{-3}$ | 100 kbit/s | 100 kbit/s |

NOTE 1: Transfer interval refers to periodicity of the packet transfers. It has to be constant during the whole operation and can be defined as being the same as the Tframe. The value given in the table is a typical one, however other transfer intervals are possible as long as the end-to-end latency is smaller than ≤ (15 − 3 × Tframe)/2 for the 2-way communication profiles and ≤ (15 − 2 × Tframe) for the 1-way communication profiles, which yields a mouth-to-ear latency of 20 ms.

NOTE 2: Packet error rate is related to a packet size of transfer interval × data rate. Packets that do not conform with the end-to-end latency are also accounted as error.

NOTE 3: The UL stream originating from a UE may be the source of a DL multicast stream.

Fig. 2

| Tframe selection | Network cost per flow | UE power consumption |
| --- | --- | --- |
| 0.5 ms | High=10 (good Packet Delay Budget (PDB) but too many transmit instances, forced to use semi-persistent scheduling/cell group (SPS/CG)) | Medium = 5 |
| 1.0 ms | High = 6 (still high overhead, and no real spectral benefit of longer PDB) | Medium = 3 |
| ... | | |
| 5 ms | Low = 3 PDB is now 5ms which allows for spectral efficient transmissions with low control channel overhead | Low = 2 |
| 7 ms | High = 9 as PDB now forces Ultra-Reliable Low-Latency Communication (URLLC) sub-ms mode | High = 7 |

Fig. 6

APPLICATION FUNCTION INFLUENCED FRAMEWORK FOR TIME SENSITIVE COMMUNICATIONS

CROSS-REFERENCE TO RELATED APPLICATIONS

This patent application claims priority from U.S. Provisional Appl. Ser. No. 62/910,374 filed Oct. 3, 2019, all of which is incorporated herein by reference in its entirety.

TECHNICAL FIELD

An example embodiment relates generally to a method, apparatus and computer program product for permitting configuration of systems, such as fifth generation systems (5GS), by an Application Function (AF) in a manner that better accommodates system constraints.

BACKGROUND

In Release-16, the specification of Time Sensitive Communications (TSC) focused on seamless integration into factory scenarios based on IEEE Time Sensitive Networking (TSN) capable Ethernet infrastructures. To that end, the IEEE provides a suite of TSN specifications to allow synchronization of bridges to grand master clocks (see, e.g., IEEE-1588 and IEEE 802.1AS), link layer bridge discovery (IEEE 802.1AB), provisioning of streams including gate scheduling along the path between TSN endpoints (IEEE 802.1Qcc and IEEE 802.1Qbv), frame replication for reliability (IEEE 802.1CB), and other protocols to enable isochronous transmission to connect endpoints across Ethernet bridges. In TSN, the 5GS acts as an Ethernet bridge within a TSN network. In another example embodiment, 5GS comprises more than one Ethernet bridge. The current integration only supports a fully centralized TSN model. For example, the 5GS serves as a bridge and reports to a Centralized Network Controller (CNC) its port capabilities including line rates and delays. The CNC then configures the bridge based on its information about end-user flows that will pass through the bridge. In this context, the setup is assumed to be very static (e.g. factory deployments that will last years) and the 5GS will have limited information of the end-user flows as the 5GS, as per the standardized solution, does not interface directly with the application. In Release-16, the 5GS exposes a 5GS bridge delay to a CNC, which then may configure gate schedules at the UE or User Plane Function (UPF) 5GS bridge ports (see 802.1Qbv and 802.1Qcc). Gate schedules provide precise intervals when port resources are reserved for periodic, deterministic traffic. Port schedules may be translated to Burst Arrival Time (BAT) and periodicity at the 5GS air-interface (Time Sensitive Communications assistance information (TSCAI) parameters). The 5GS has no control over these parameters, and whether they align with transmission constraints in the Radio Access Network (RAN).

In Release-17, the 5GS support for TSC is extended to new vertical services, including Video, Imaging and Audio for Professional Applications (VIAPA) as defined in the 3$^{rd}$ Generation Partnership Project (3GPP) Technical Specification (TS) 22.263. Such services will be setup in an ad-hoc manner for live events including "live news-gathering, sports events, music festivals, among others" as stated in the 3GPP technical specification (TS). As a second change compared to Release-16, the VIAPA services are more flexible in the sense of how the transport is configured as long as some other metrics are maintained by the system. An example of such flexibility comes from above TS (e.g. illustrated in the footnote of the table of FIG. 2). FIG. 2 shows an example table with column headings: profile, # of active user equipments (UEs), # of uplink streams, # of downlink streams, UE speed, service area, end-to-end (E2E) latency, transfer interval, packet error rate, data rate uplink, and data rate downlink. As shown in FIG. 2, there are two example profiles: integrated audience services and intercom system.

BRIEF SUMMARY

A method, apparatus and computer program product are provided in accordance with an example embodiment to receive, from a source, performance requirements, and cause transmission, to a network, of a request to influence time sensitive communications (TSC) configuration parameters. The methods, apparatuses, and computer program product also include in response to the request to influence time sensitive communications (TSC) configuration, receiving, from the network, network configuration and radio access network (RAN) resource constraints and determining a quality of service (QoS) and the TSC configuration parameters to support a TSC data stream based on the performance requirements received from the source, the network configuration received from the network, and the RAN resource constraints. In an example embodiment, methods, apparatuses, and computer program product also include causing transmission of the determined quality of service (QoS) and the TSC configuration parameters to the network and the source and in an instance the network accepts the determined quality of service (QoS) and the TSC configuration parameters, configure resources for the TSC data stream and continuously support service continuity.

In another example embodiment, methods, apparatuses, and computer program products are configured to receive, from an application function, a request to influence time sensitive communications (TSC) configuration parameters, the request further comprises performance requirements issued by a source, receive radio access network (RAN) resource constraints, determine a quality of service (QoS) and the TSC configuration parameters to support a TSC data stream based on the performance requirements issued by the source, network configuration, and the RAN resource constraints, transmit the determined quality of service (QoS) and the TSC configuration parameters to the RAN and the application function; and configure resources for the TSC data stream and continuously support service continuity.

In an example embodiment, the TSC configuration parameters comprise a periodicity of the TSC data stream and an offset from the TSC data stream. The source is associated with video, imaging and/or audio production applications or deterministic applications and the performance requirements are associated with low latency deterministic periodic traffic with unicast or multicast service. In another example embodiment, the performance requirements received from the source comprise a first parameter related to a target end-to-end latency and a second parameter related to one-way or two-way communication flow, wherein the performance requirements received from the source further comprise a first indicator that allows for setting the periodicity of the TSC data stream and a second indicator that allows for setting the offset from the TSC data stream. In yet another example embodiment, the network configuration received from the network further comprises cost functions associated with system performance or application performance.

BRIEF DESCRIPTION OF THE DRAWINGS

Figure 3:
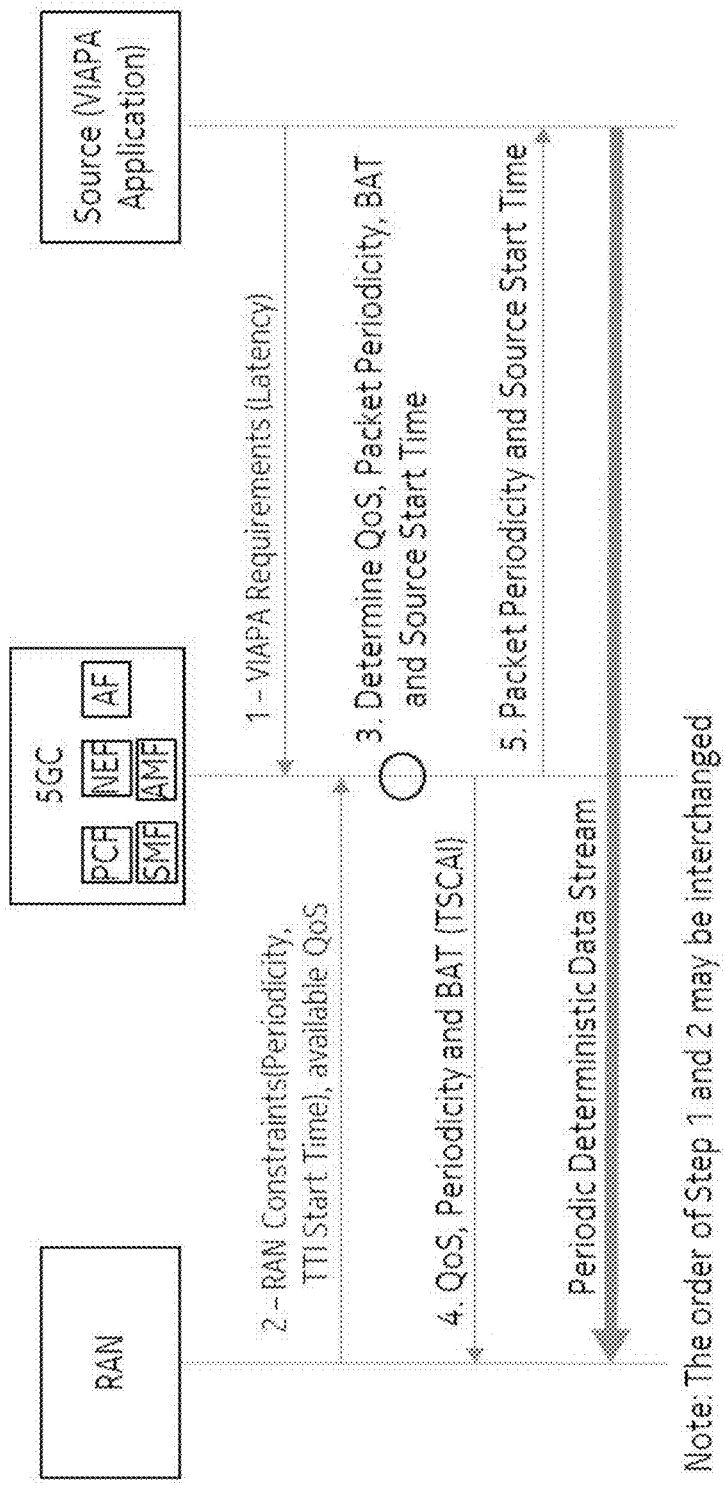
Figure 4:
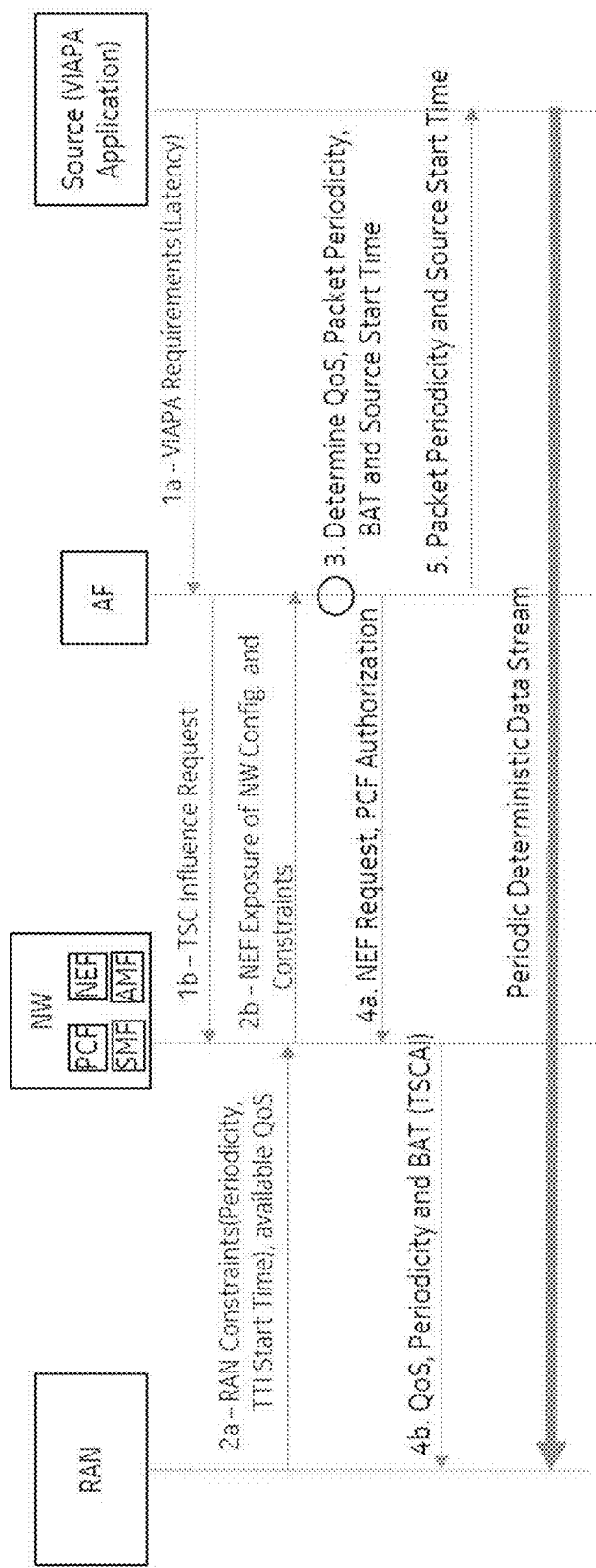
Figure 5:
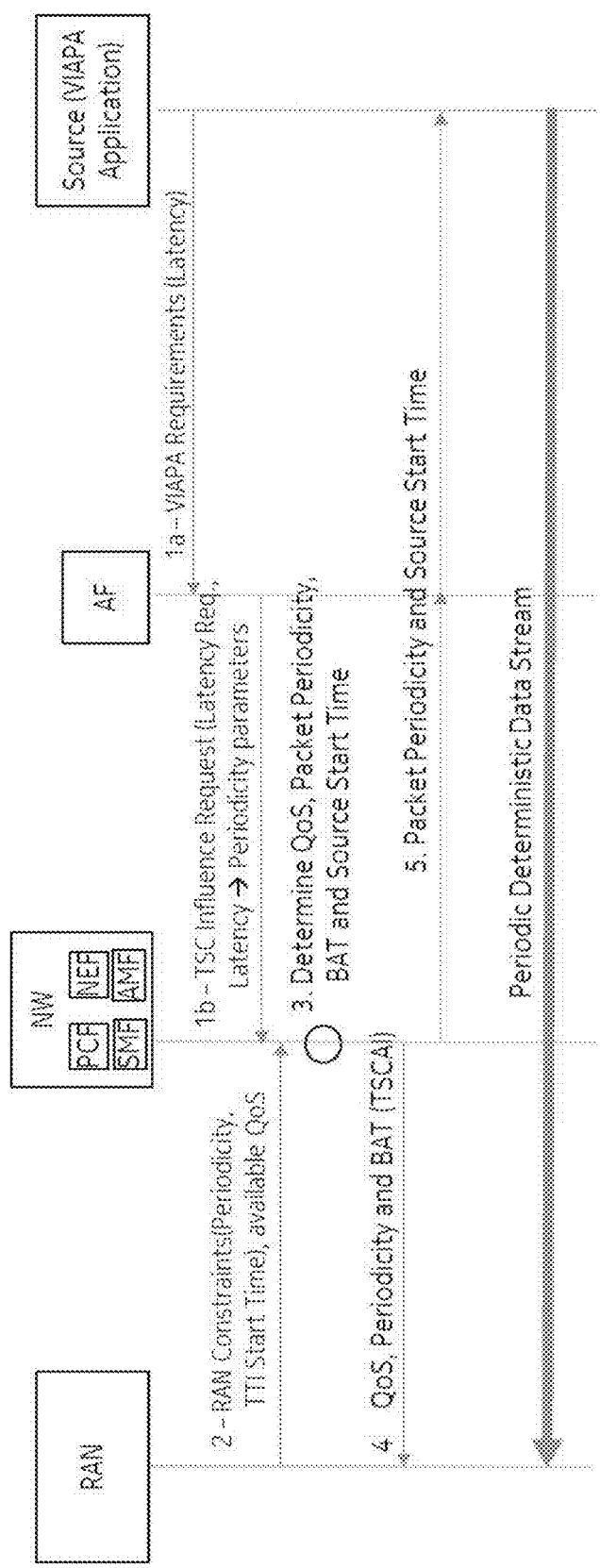

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 presents a table of performance requirements;

FIGS. 3, 4, and 5 illustrate dataflow frameworks of a 5GS system in accordance with certain example embodiments of the present disclosure;

FIG. 6 presents a table of 5GS characteristics; and

Figure 7:
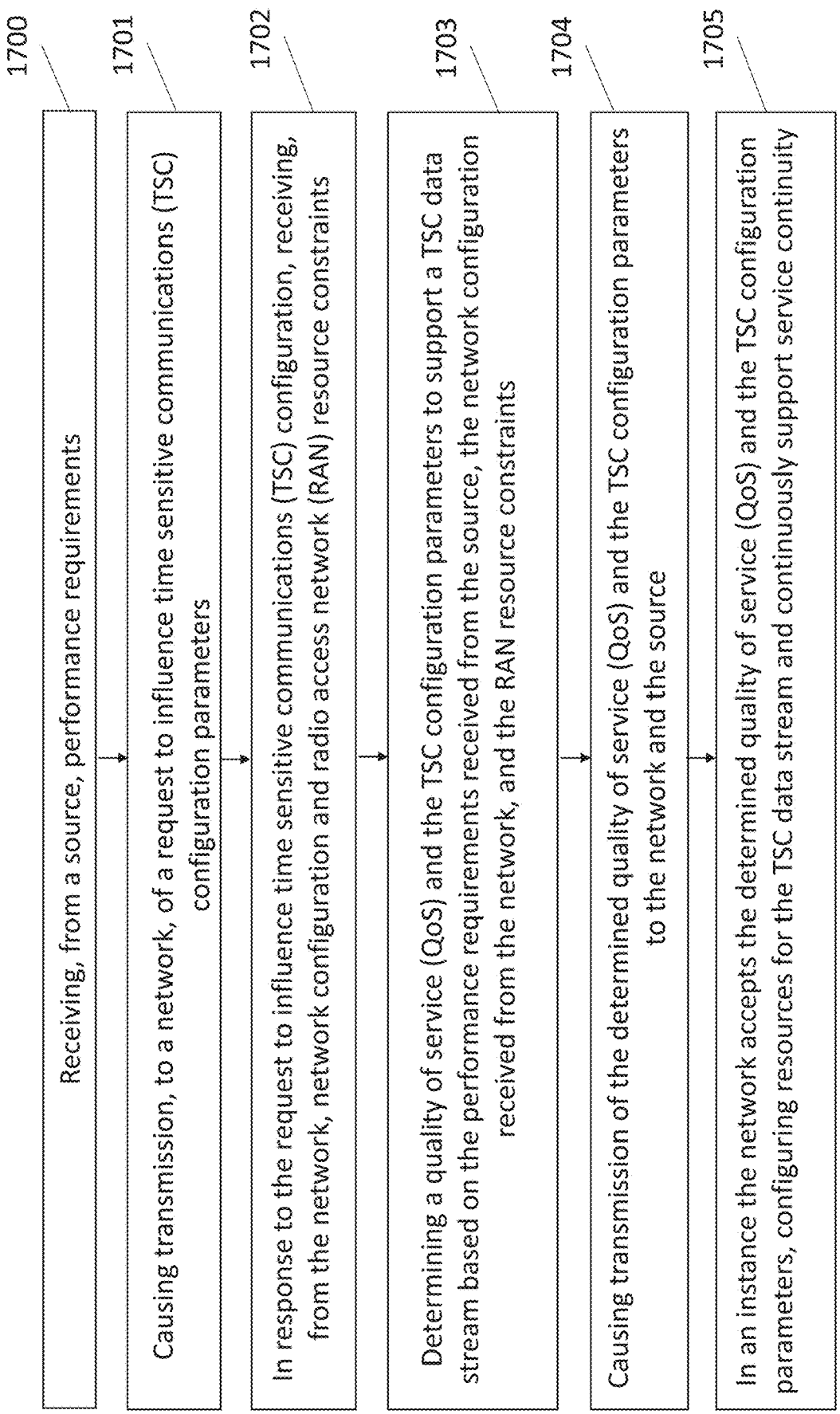
Figure 8:
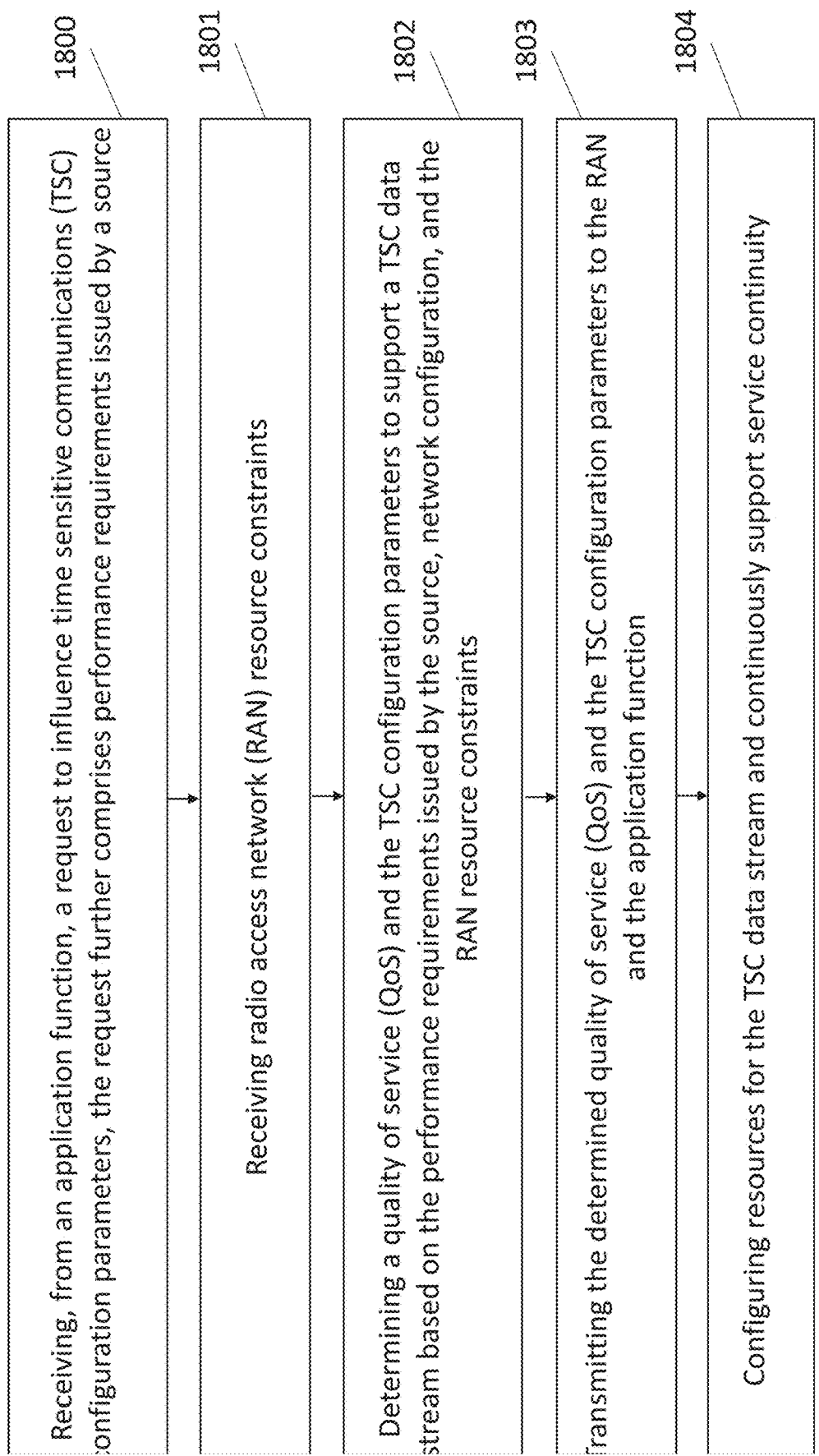

FIGS. 7 and 8 are flowcharts illustrating operations performed, such as by the apparatus of FIG. 1, in accordance with certain example embodiments of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment to operate a network entity for a cellular radio communications network, in particular, to operate an application function (AF) in a core network of a 5G network and enhance the 5GS framework for obtaining application input for QoS and Time Sync related aspects for providing TSC services, particularly for optimal configuration of Video, Imaging and Audio for Professional Applications (VIAPA) leading both to improved 5GS performance and application performance. The TSC services may configure the 5GS with one or more TSC paths between stations. These TSC paths may be configured using a QoS that provides transmission in accordance with gated schedules, which specify the transmit time and/or the periodicity of the transmission for one or more interfaces in the 5GS system (including, for example, 5G air interface transmission over the 5G radio access network). Along a TSC path, each 5G node may (e.g., user equipment) along a TSC communication path may have a corresponding gated schedule. These gated schedules may provide a deterministic, low-delay TSC communication path, in accordance with some example embodiments. The QoS configured by the 5GS may take into account the requirements of the industrial network to provide support for TSC (e.g., which provides low latency, deterministic data transmission, and high reliability).

In order to embody an AF or other network component of a core network, such as a 5GS network, an apparatus 10 is provided as shown, for example, in FIG. 1. The apparatus may be embodied by any of a variety of different components such as different nodes of a 5G core network instance, such as the AF. As shown in FIG. 1, the apparatus of an example embodiment includes, is associated with or is otherwise in communication with a processor 12, an associated memory 14 and a communication interface 16.

The processor 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In traditional TSC, an end station connection is set up and the network provides long-term guarantees for the performance (e.g., link speed, delay, etc.) and then a flow is forced upon the system to be supported. For example, the periodicity of TSN streams is dictated by requirements specified by the end-station. In a private wide area network (WAN) or public WAN setting, the network will be limited by many factors. Moreover, the network may have no influence or knowledge on the data flow that will be configured for it, and will need to provide worst-case conservative estimates that limit the applications that can be supported. In the audio and video (AV) production case, and leveraging the Release-16 TSC solution, the CNC can choose an arbitrary periodicity of the AV flow if the periodicity is not specified by the source. However, such periodicity may not fit to 5GS constraints such as allowable RAN transmission intervals, configured TDD patterns, etc. as it may be based on working with normal wired bridges having time-varying behavior.

The above may lead to notable challenges. For example, 5GS may be conservative, such by offering performance to applications that is lower than what is possible (e.g., the 5GS bridge capabilities reported to the CNC may be worst case values to ensure they can be satisfied for a long period of time). For example, the RAN latency component of the total latency reported to a CNC must account for the prospect of TSN stream periods that are misaligned with RAN constraints.

For example, with any arbitrary periodicity, the 5GS struggles with re-aligning its resourcing as seen from the 3GPP RAN WG2 concepts developed in 3GPP Release-16. Effectively, this means that more spectrum is needed for a given use-case, thus unnecessarily increasing the cost of delivering services without improving the application performance. Therefore, the existing framework may lead to worsening application performance in service level agreement (SLA) mode and lower spectral efficiency causing higher cost of delivering these new services.

Referring now to FIG. 3, FIG. 3 illustrates an enhancement to the 5GS framework for obtaining application input for QoS and time synchronization-related aspects for providing TSC services, particularly for improved configuration of Video, Imaging and Audio for Professional Applications (VIAPA) leading both to improved 5GS performance and application performance. In an example embodiment, the flexibility for the network to define transmission characteristics such as "Transfer Interval" (packet periodicity) for these applications allows for negotiation of 5GS QoS flows such that RAN resource constraints are accommodated and RAN performance (such as latency) and resource utilization is improved.

In some embodiments and as shown in FIG. 3, applications provide latency requirements for TSC QoS flows directly. The RAN specifies QoS flow constraints for traffic transmission time and traffic arrival periodicity, resource usage information and optionally the RAN QoS that can be achieved with different levels of constraints. The 5G core network (5GC) determines the QoS to request, and the best periodicity for the application, taking into account both inputs, and then informs both the RAN and source of the TSC flow attributes.

FIG. 3 depicts a negotiation of attributes between applications and the 5GS to improve for RAN constraints. The additional dynamic events shown in FIG. 3 enable such negotiation to the network exposure function (NEF) of the 5GS (e.g., the AF can subscribe to above new event notifications via the NEF. The AF may send the request (e.g., a message including the at least one quality of service parameter indicative of the scheduled gate time) towards policy control function via a network exposure function. The at least one quality of service parameter indicative of scheduled gate times for transmission may enable the scheduling of flow transmissions among 5G nodes. Each of the one or more 5G nodes along the time sensitive communication path may have a corresponding scheduled gate time for transmission of the user plane traffic to provide a deterministic path for the user plane traffic.

In an example embodiment, the source or VIAPA application transmits VIAPA requirements comprising latency requirements to 5GC as depicted by block 1. Block 2 shows the RAN transmitting resource constraints comprising periodicity, transmission time interval (TTI) start time, and available QoS flows to the 5GC. In another example embodiment, blocks 1 and 2 may be interchanged. 5GC will then determine the QoS, packet periodicity, BAT, and source start time as shown by operation 3. Block 4 shows the 5GC transmitting the determined QoS, periodicity, and BAT to the RAN for use in scheduling and resource allocation. The 5GC may also transmit the negotiated packet periodicity and source start time to the VIAPA application as shown by block 5. As depicted by FIG. 3, the 5GC determines the QoS to request, and the best periodicity for the application, taking into account both inputs, and then informs both the RAN and Source of the TSC flow attributes.

In some example embodiments, when negotiating the traffic configuration between the AF and the NW, two alternative embodiments may be considered as depicted by dataflow frameworks illustrated in FIGS. 4 and 5.

FIG. 4 illustrates an example embodiment where the AF decides the TSC configuration. In an example embodiment, the source application provides requirements to the AF and the AF makes a request to the NW. In an example embodiment, the AF receives VIAPA requirements, such as the latency requirements, from a source, such as a VIAPA application, as shown in block 1a and the AF makes a request to a network (NW) component as shown in block 1b. The NW receives RAN constraints from the RAN including, for example, periodicity, TTI start time and available QOS as shown in block 2a and then provides information regarding the network configuration and resource constraints to the AF as shown in block 2b. In block 3, the AF determines the QoS it wishes to request, and TSCAI information, such as packet periodicity, BAT and the source start time. The AF then transmits an NEF request and packet control function to the NW in block 4a which, in turn, provides the TSCAI, including the QoS, the periodicity and the BAT to the RAN as shown in block 4b. The AF also informs the source, such as the VIAPA application, of the periodicity and optionally the start time for the TSC stream as shown in block 5. The source, such as the VIAPA application, may then provide a periodic deterministic data stream to the RAN.

FIG. 5 illustrates an example embodiment where the NW decides the TSC configuration. For example, the source application provides requirements to the AF and the AF makes a request to the NW. In another example embodiment, the AF receives VIAPA requirements, such as the latency requirements, from a source, such as a VIAPA application, as shown in block 1a and the AF makes a request to NW as shown in block 1b. The request to the NW may include the latency requirements with latency, in turn, defining the periodicity parameters. The RAN provides RAN constraints to the NW in block 2 including, for example, the periodicity, the TTI start time and the available QoS. As shown in block 3, the NEF component of the NW decides on a configuration option including, for example, the QoS, the packet periodicity, the BAT and the source start time. The NW then notifies the RAN as to the TSCAI, such as the QoS, the periodicity and the BAT, as shown in block 4 and notifies the source, such as the VIAPA of the packet periodicity and the source start time as shown in block 5. The source, such as the VIAPA application, may then provide a periodic deterministic data stream to the RAN.

In an example embodiment, in order to influence the TSC configuration, both the AF and NW may have an agreement on certain parameters: i) periodicity (e.g., packet interval) and ii) network delay (e.g., the 5GS delay promised by the network). In some use cases, such as A/V streams, the selection of the periodicity will impact other traffic parameters, such as packet size (e.g., the packet size will depend on the bitrate). The dependency between parameters makes the determination of TSC configuration complex. For such cases, the AF may compute/determine TSC configurations it prefers based on the network information, and then the network composed by the policy control function (PCF) can decide whether that the configuration(s) are acceptable.

In blocks 3 of FIGS. 3, 4, and 5, the 5GS is configured to provide at least the following minimum periodicity, or periodicities if the RAN can support more than one. In an example embodiment, the AF can pick a periodicity that aligns with SCS, TTI configuration, TDD pattern, etc. In another example embodiment, the cost function of how possible periodicities impact either system performance of application performance is depicted in the table shown in FIG. 6. For example, the cost function depends on the user equipment (UE) for which the service is provided for as well as the local deployment environment. Release-16 TSC framework (where latency is reported per UE/port) provides examples of such UE-specific cost function. In another example embodiment, the cost function for more temporal services and ad-hoc deployments depend on the existing state of the network including existing services running.

Further, processing performed in blocks 3 of FIGS. 3, 4, and 5, further include any "M,N" parameter calculations if applicable, determination of what portion of the resulting delay may be consumed by the 5GS and make the request to the PCF via the NEF. Additionally, blocks 3 of FIGS. 3, 4, and 5 may determine Latency_requirement=(M−N× Tframe)) using this formula or any other similar formula.

In yet another example embodiment, the AF to Source/application pending permissions/allowance by the source, can select a Tframe that fits with the periodicity granularity provided by the 5GS, or it can use a Tframe provided by the Source. In another example embodiment, the request to influence time sensitive communications (TSC) configuration parameters may further comprise a 5GS delay requirement, periodicity and optionally port schedules translated to Burst Arrival Time (BAT) at the 5G air-interface (TSCAI parameters).

The ability to determine the QoS configuration including the determination of periodicity from end-to-end latency in operation 3 of FIGS. 3, 4, and 5 may depend upon several inputs and may involve a cost function as described herein. In an example embodiment, the source or VIAPA application may provide two application dependent parameters: M and N. In an example embodiment, M is a parameter that is known by the VIAPA industry and relates to the target end-to-end (E2E) latency between the source and the RAN including processing times and configuration of the message protocols. Examples of M are included in the TS 22.263. For example, for integrated audience services or intercom systems, may have, e.g., M=15 ms, while professional audio may have, e.g., M=2 ms). The other application dependent parameter N is known by the VIAPA industry and relates to whether this a one-way or two-way flow, (e.g., examples of N=2 and N=3) as provided in the TS 22.263.

In some embodiments, two new indicators may be provided in which one of the indicators signals whether or not the source permits the network to set periodicity (or transfer interval, which is a key trait of TSC services). Another indicator that is provided in this example embodiment indicates whether the source permits the network to set the offset (e.g., Burst Arrival Time (BAT), which is a key trait of TSC services).

FIG. 6 illustrates a table for source parameters M=15, N=2. Some parameters are estimated by the network while others may be based on network achieved models (e.g., incurred user equipment (UE) power consumption). As shown in FIG. 6, for different Tframe selections, the network cost per flow and the UE power consumption are provided. The Tframe represents the time interval between consecutive audio frames at application layer and also used to denote the transfer interval. The network cost per flow allows the AF to estimate the number of flows that the network can support. For example, a value of 10 means that a flow requires twice as many resources as a flow with a value of 5. The UE power consumption may also depend on where in the cell that the UE is located, the traffic pattern, packet sizes including segmentation, etc. FIG. 6 does not include other application traits such as reliability as this example assumes that all provided options meet some minimum requirements for the application.

Turning now to FIGS. 7 and 8, the operations performed by the AF and NW, respectively which may be embodied by the apparatus illustrated in FIG. 1 in accordance with example embodiments are illustrated. As shown in block 1700, the apparatus includes means, such as the processor 12, the communication interface 16 or the like, for receiving, from a source, performance requirements. In an example embodiment, the performance requirements received from the source comprise a first parameter related to a target end-to-end latency and a second parameter related to one-way or two-way communication flow.

Block 1701 corresponds to the apparatus including means, such as the processor 12, the communication interface 16 or the like, for causing transmission, to a network, of a request to influence time sensitive communications (TSC) configuration parameters. The TSC configuration parameters comprising a periodicity of the TSC data stream and an offset from the TSC data stream. In an example embodiment, the source is associated with video, imaging and/or audio production applications or deterministic applications and the performance requirements are associated with low latency deterministic periodic traffic with unicast or multicast service.

In an example embodiment, the apparatus including means, such as the processor 12, the communication interface 16 or the like, for in response to the request to influence time sensitive communications (TSC) configuration, receiving, from the network, network configuration and radio access network (RAN) resource constraints as shown in block 1702. In an example embodiment, the performance requirements received from the source further comprise a first indicator that allows for setting the periodicity of the TSC data stream and a second indicator that allows for setting the offset from the TSC data stream. In yet another example embodiment, the network configuration received from the network further comprises cost functions associated with system performance or application performance.

The apparatus includes means, such as the processor 12, the communication interface 16 or the like, for determining a quality of service (QoS) and the TSC configuration parameters to support a TSC data stream based on the performance requirements received from the source, the network configuration received from the network, and the RAN resource constraints as shown by block 1703. In block 1704, the apparatus includes means, such as the processor 12, the communication interface 16 or the like, for causing transmission of the determined quality of service (QoS) and the TSC configuration parameters to the network and the source. In another example embodiment, the apparatus includes means, such as the processor 12, the communication interface 16 or the like, for in an instance the network accepts the determined quality of service (QoS) and the TSC configuration parameters, configuring resources for the TSC data stream and continuously support service continuity as shown in block 1705.

FIG. 8 is an example flowchart illustrating a method of operating an example apparatus, for example, apparatus 10, embodied by, for example, NW, performed in accordance with an embodiment of the present invention. As shown in block 1800, the apparatus includes means, such as the processor 12, the communication interface 16 or the like, for receiving, from an application function, a request to influence time sensitive communications (TSC) configuration parameters, the request further comprises performance requirements issued by a source. In block 1801, the apparatus includes means, such as the processor 12, the communication interface 16 or the like, for receiving radio access network (RAN) resource constraints. The apparatus further includes means, such as the processor 12, the communication interface 16 or the like, for determining a quality of service (QoS) and the TSC configuration parameters to support a TSC data stream based on the performance requirements issued by the source, network configuration, and the RAN resource constraints as shown in block 1802.

The apparatus further includes means, such as the processor 12, the communication interface 16 or the like, for transmitting the determined quality of service (QoS) and the TSC configuration parameters to the RAN and the application function as shown by block 1803. In an example embodiment and as shown in block 1804, the apparatus includes means, such as the processor 12, the communication interface 16 or the like, for configuring resources for the TSC data stream and continuously support service continuity. In an example embodiment, the TSC configuration parameters comprise a periodicity of the TSC data stream and an offset from the TSC data stream. For example, the source is associated with video, imaging and/or audio production applications or deterministic applications and the performance requirements are associated with low latency deterministic periodic traffic with unicast or multicast service. In yet another example embodiment, the performance requirements issued by the source comprise a first parameter related to a target end-to-end latency and a second parameter related to one-way or two-way communication flow. In another example embodiment, the performance requirements issued by the source further comprise a first indicator that allows setting the periodicity of the TSC data stream and a second indicator that allows setting the offset from the TSC data stream and wherein the network configuration received from the network further comprises cost functions associated with system performance or application performance.

As described above, FIGS. 7 and 8 are flowcharts of an apparatus 10, method, and computer program product according to certain example embodiments. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 7. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving, from a source, performance requirements;
causing transmission, to a network, of a request to influence time sensitive communications (TSC) configuration parameters, wherein the TSC configuration parameters comprise a periodicity of a TSC data stream and an offset from the TSC data stream;
in response to the request to influence time sensitive communications (TSC) configuration parameters, receiving, from the network, network configuration and radio access network (RAN) resource constraints, wherein the RAN resource constraints comprise one or more of periodicity, transmission time interval (TTI) start time or available quality of service (QoS) flows;
determining a quality of service (QoS) and the TSC configuration parameters to support the TSC data stream based on the performance requirements received from the source, the network configuration received from the network, and the RAN resource constraints;
causing transmission of the determined quality of service (QoS) and the TSC configuration parameters to the network and the source; and
in an instance the network accepts the determined quality of service (QoS) and the TSC configuration parameters, configuring resources for the TSC data stream and continuously supporting service continuity.

2. A method according to claim 1 wherein the source is associated with video, imaging and/or audio production applications or deterministic applications and the performance requirements are associated with low latency deterministic periodic traffic with unicast or multicast service.

3. A method according to claim 1 wherein the performance requirements received from the source comprise a first parameter related to a target end-to-end latency and a second parameter related to one-way or two-way communication flow.

4. A method according to claim 1 wherein the performance requirements received from the source further comprise a first indicator that allows for setting the periodicity of the TSC data stream and a second indicator that allows for setting the offset from the TSC data stream.

5. A method according to claim 1 wherein the network configuration received from the network further comprises cost functions associated with system performance or application performance.

6. A method according to claim 1, wherein the request to influence TSC configuration parameters is transmitted via a network exposure function.

7. A method according to claim 1, wherein the TSC parameters comprise two or more periodicities.

8. An apparatus comprising:
at least one processor; and
at least one memory including computer program code, the at least one memory and the computer program code configured to, with the at least one processor, cause the apparatus to at least:
receive, from a source, performance requirements;
cause transmission, to a network, of a request to influence time sensitive communications (TSC) configuration parameters, wherein the TSC configuration parameters comprise a periodicity of a TSC data stream and an offset from the TSC data stream;
in response to the request to influence time sensitive communications (TSC) configuration parameters, receive, from the network, network configuration and radio access network (RAN) resource constraints, wherein the RAN resource constraints comprise one or more of periodicity, transmission time interval (TTI) start time or available quality of service (QoS) flows;
determine a quality of service (QoS) and the TSC configuration parameters to support the TSC data stream based on the performance requirements received from the source, the network configuration received from the network, and the RAN resource constraints;
cause transmission of the determined quality of service (QoS) and the TSC configuration parameters to the network and the source; and
in an instance the network accepts the determined quality of service (QoS) and the TSC configuration parameters, configure resources for the TSC data stream and continuously support service continuity.

9. An apparatus according to claim 8 wherein the source is associated with video, imaging and/or audio production applications or deterministic applications and the performance requirements are associated with low latency deterministic periodic traffic with unicast or multicast service.

10. An apparatus according to claim 8 wherein the performance requirements received from the source comprise a first parameter related to a target end-to-end latency and a second parameter related to one-way or two-way communication flow.

11. An apparatus according to claim 8 wherein the performance requirements received from the source further comprise a first indicator that allows for setting the periodicity of the TSC data stream and a second indicator that allows for setting the offset from the TSC data stream.

12. An apparatus according to claim 8 wherein the network configuration received from the network further comprises cost functions associated with system performance or application performance.

13. An apparatus according to claim 8, wherein the request to influence TSC configuration parameters is transmitted via a network exposure function.

14. A method comprising:
receiving, from an application function, a request to influence time sensitive communications (TSC) configuration parameters, the request further comprises performance requirements issued by a source, wherein the TSC configuration parameters comprise a periodicity of a TSC data stream and an offset from the TSC data stream;
receiving radio access network (RAN) resource constraints, wherein the RAN resource constraints comprise one or more of periodicity, transmission time interval (TTI) start time or available quality of service (QoS) flows;
determining a quality of service (QoS) and the TSC configuration parameters to support a TSC data stream based on the performance requirements issued by the source, network configuration, and the RAN resource constraints;
transmitting the determined quality of service (QoS) and the TSC configuration parameters to the RAN and the application function; and
configuring resources for the TSC data stream and continuously supporting service continuity.

15. A method according to claim 14 wherein the source is associated with video, imaging and/or audio production applications or deterministic applications and the performance requirements are associated with low latency deterministic periodic traffic with unicast or multicast service.

16. A method according to claim 14 wherein the performance requirements issued by the source comprise a first parameter related to a target end-to-end latency and a second parameter related to one-way or two-way communication flow.

17. A method according to claim 14 wherein the performance requirements issued by the source further comprise a first indicator that allows setting the periodicity of the TSC data stream and a second indicator that allows setting the offset from the TSC data stream.

18. A method according to claim 14 wherein the network configuration received from the network further comprises cost functions associated with system performance or application performance.

19. A method according to claim 14, wherein the request to influence TSC configuration parameters is transmitted via a network exposure function.

20. A method according to claim 14, wherein the TSC parameters comprise two or more periodicities.

* * * * *